United States Patent
Choi et al.

(10) Patent No.: US 10,162,206 B2
(45) Date of Patent: Dec. 25, 2018

(54) LIQUID CRYSTAL DISPLAY DEVICE

(71) Applicant: LG DISPLAY CO., LTD., Seoul (KR)

(72) Inventors: Min-Geon Choi, Paju-si (KR); Kyeong-Jin Kim, Goyang-si (KR); Kyung-Su Ha, Gwangju (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/363,893

(22) Filed: Nov. 29, 2016

(65) Prior Publication Data
US 2017/0153489 A1    Jun. 1, 2017

(51) Int. Cl.
| | | |
|---|---|---|
| *G02F 1/1333* | (2006.01) | |
| *G02F 1/1334* | (2006.01) | |
| *G02F 1/1335* | (2006.01) | |
| *G02F 1/1343* | (2006.01) | |
| *G02F 1/1362* | (2006.01) | |
| *G02F 1/1368* | (2006.01) | |

(52) U.S. Cl.
CPC ...... *G02F 1/133345* (2013.01); *G02F 1/1334* (2013.01); *G02F 1/1368* (2013.01); *G02F 1/133528* (2013.01); *G02F 1/134309* (2013.01); *G02F 1/134363* (2013.01); *G02F 1/136286* (2013.01); *G02F 2001/133531* (2013.01); *G02F 2001/136222* (2013.01); *G02F 2201/50* (2013.01); *G02F 2202/28* (2013.01)

(58) Field of Classification Search
CPC ......... G02F 1/133345; G02F 1/133528; G02F 1/1334; G02F 1/134309; G02F 1/136286; G02F 1/1368; G02F 2001/133531; G02F 2001/136222; G02F 2202/28; G02F 1/134363; G02F 2201/50

USPC .......................................................... 349/141
See application file for complete search history.

(56) References Cited

U.S. PATENT DOCUMENTS

| | | | | |
|---|---|---|---|---|
| 8,743,318 B2* | 6/2014 | Baek | ....................... | G02F 1/137 349/86 |
| 8,988,642 B2* | 3/2015 | Lim | ..................... | G02F 1/1334 349/141 |
| 2007/0040969 A1* | 2/2007 | Yoshida | ................ | G02F 1/1393 349/114 |
| 2010/0265210 A1* | 10/2010 | Nakanishi | ........... | G02F 1/13338 345/174 |
| 2012/0019738 A1* | 1/2012 | Cox | ....................... | C09K 19/38 349/36 |
| 2012/0113362 A1* | 5/2012 | Lim | ..................... | G02F 1/1323 349/96 |
| 2014/0184984 A1 | 7/2014 | Kim et al. | | |
| 2015/0109547 A1 | 4/2015 | Kim et al. | | |

FOREIGN PATENT DOCUMENTS

| | | |
|---|---|---|
| KR | 20130047649 A | 5/2013 |
| KR | 1020140088470 A | 10/2014 |
| KR | 1020140088471 A | 10/2014 |

* cited by examiner

*Primary Examiner* — Charles Chang
(74) *Attorney, Agent, or Firm* — Dentons US LLP

(57) ABSTRACT

Provided herewith is a liquid crystal display device comprising a substrate; first and second electrodes on a first surface of the substrate, the first and second electrodes being spaced apart from each other; a liquid crystal capsule layer on the first and second electrodes; and a dielectric layer on the liquid crystal capsule layer. In this liquid crystal display device the dielectric constant of the dielectric layer is lower than the dielectric constant of the liquid crystal capsule layer.

11 Claims, 4 Drawing Sheets backlight unit (60)

LIQUID CRYSTAL DISPLAY DEVICE

CROSS-REFERENCE TO RELATED APPLICATION

This application claims the benefit of Korean Patent Application No. 10-2015-0169519 filed on Nov. 30, 2016, which is incorporated herein by reference as if fully set forth herein.

BACKGROUND

Technical Field

The present disclosure relates to a liquid crystal display device, including a liquid crystal display device with a liquid crystal capsule layer.

Discussion of the Related Art

Recently, with the rapid progress of the information age, there is an increasing demand for various types of display devices. For example, various flat panel displays (FPDs) such as a liquid crystal display (LCD) device, a plasma display panel (PDP), a field emission display (FED) device and an organic light emitting diode (OLED) display devices have been researched. Since FPDs have advantages such as a thin profile, light weight and low power consumption, cathode ray tube (CRT) devices have been widely replaced with FPDs.

Among various FPDs, an LCD device has various features such as a high contrast ratio and a superior moving image display capability. LCD devices have been widely used, such as in computer monitors or televisions.

FIG. 1 is a cross-sectional view illustrating a liquid crystal display device according to the related art.

As shown in FIG. 1, a related art liquid crystal display (LCD) device 10 includes a liquid crystal panel and a backlight unit 60 under the liquid crystal panel. The liquid crystal panel includes first and second substrates 2 and 4 and a liquid crystal layer 50 between the first and second substrates 2 and 4.

A thin film transistor (TFT) Tr on an inner surface of the first substrate 2 includes a gate electrode 12, a gate insulating layer 13, an active layer 14, ohmic contact layers 15a and 15b, a source electrode 16 and a drain electrode 17. The drain electrode 17 is connected to a first electrode 19 in a pixel region P through a contact hole in the interlayer insulating layer 18.

A black matrix 32 surrounding the pixel region P is formed on an inner surface of the second substrate 4 to block a non-display element such as the TFT Tr of the first substrate 2 and to expose the first electrode 19. In addition, a color filter layer 34 corresponding to the pixel region P is formed in the black matrix 32. The color filer layer 34 has a lattice shape, and overlaps with an edge of the black matrix 32. A second electrode 36 is formed on the black matrix 32 and the color filter layer 34.

Polarizing plates 20 and 30 transmitting a selected polarization component are formed on outer surfaces of the first and second substrates 2 and 4, respectively.

A first alignment layer 31a is formed between the first electrode 19 and the liquid crystal layer 50, and a second alignment layer 31b is formed between the second electrode 36 and the liquid crystal layer 50. The first and second alignment layers 31a and 31b determine an initial alignment state and an initial alignment direction of the liquid crystal molecules in the liquid crystal layer 50.

A seal pattern 70 is formed at an edge portion between the first and second substrates 2 and 4 to prevent leakage of the liquid crystal layer 50.

Since the LCD device 10 is not an emissive device, the additional backlight unit 60 disposed under the liquid crystal panel provides light to the liquid crystal panel.

The liquid crystal layer 50 includes one of a nematic liquid crystal, a smectic liquid crystal and a cholesteric liquid crystal.

In the related art LCD device 10, after the TFT Tr and the first electrode 19 are formed on the first substrate 2 and the color filter layer 34 and the second electrode 36 are formed on the second substrate 4, the first and second substrates 2 and 4 are attached to each other. Since an additional alignment process is required to attach the first and second substrates 2 and 4, the corresponding fabrication process is complicated and the fabrication cost increases.

In addition, an alignment process including a printing step and a rubbing step of the alignment layers 31a and 31b is required for aligning the liquid crystal molecules. As a result, the production yield is reduced.

Further, after the liquid crystal molecules are injected into the attached first and second substrates 2 and 4, the first and second substrates 2 and 4 have to be kept spaced apart from each other by a uniform gap. When the gap between the first and second substrates 2 and 4 is changed by an external pressure or an external impact, the display quality of the LCD device 10 deteriorates.

SUMMARY

Various embodiments of the present disclosure relate that substantially obviates one or more of the problems due to limitations and disadvantages of the related art are described herein. For example, one exemplary embodiment is a liquid crystal display device which prevents deterioration of a liquid crystal capsule layer, thereby improving transmittance.

Advantages and features of the present disclosure will be set forth in part in the following description, and in part, will become apparent to those having ordinary skill in the art upon examination of the following or may be learned from practice of the present disclosure. Other advantages and features of the embodiments of the present disclosure may be realized and attained by the structure particularly pointed out in the written description and any appended claims and drawings.

An exemplary embodiment of the present disclosure provides a liquid crystal display device comprising: a substrate; first and second electrodes on a first surface of the substrate, the first and second electrodes being spaced apart from each other; a liquid crystal capsule layer on the first and second electrodes; and a dielectric layer on the liquid crystal capsule layer, wherein a dielectric constant of the dielectric layer is lower than a dielectric constant of the liquid crystal capsule layer.

In another exemplary embodiment, the liquid crystal display device further comprises a first polarizing film on a second surface of the substrate, wherein the second surface of the substrate is opposite to the first surface of the substrate; and a second polarizing film on the dielectric layer, wherein a polarization axis of the first polarizing film is perpendicular to a polarization axis of the second polarizing film.

In another exemplary embodiment, the dielectric layer includes an adhesive material.

In another exemplary embodiment, the liquid crystal display device further comprises an adhesive layer between the dielectric layer and the second polarizing film.

In another exemplary embodiment, the dielectric layer includes a transparent material.

In another exemplary embodiment, the dielectric layer has a dielectric constant lower than 8.

In another exemplary embodiment, the dielectric layer has a thickness of 2 μm to 5 μm.

In another exemplary embodiment, the liquid crystal capsule layer has a film type.

In another exemplary embodiment, the liquid crystal display device further comprises a color filter layer on the substrate; and a passivation layer on the color filter layer, wherein the first and second electrodes are disposed on the passivation layer.

In another exemplary embodiment, the liquid crystal display device further comprises a gate line on the substrate; a data line crossing the gate line; a common line parallel to the data line; and a thin film transistor connected to the gate line and the data line It is to be understood that both the foregoing general description and the following detailed description are exemplary and explanatory, and are intended to provide further explanation of the invention as claimed, but the present disclosure is not limited thereto.

BRIEF DESCRIPTION OF THE DRAWINGS

The accompanying drawings, which are included to provide a further understanding of the present disclosure, are incorporated in, and constitute a part of, this specification. The drawings illustrate various embodiments of the present disclosure, and together with the description herein, serve to explain the principles of this disclosure.

DETAILED DESCRIPTION

Figure 1:
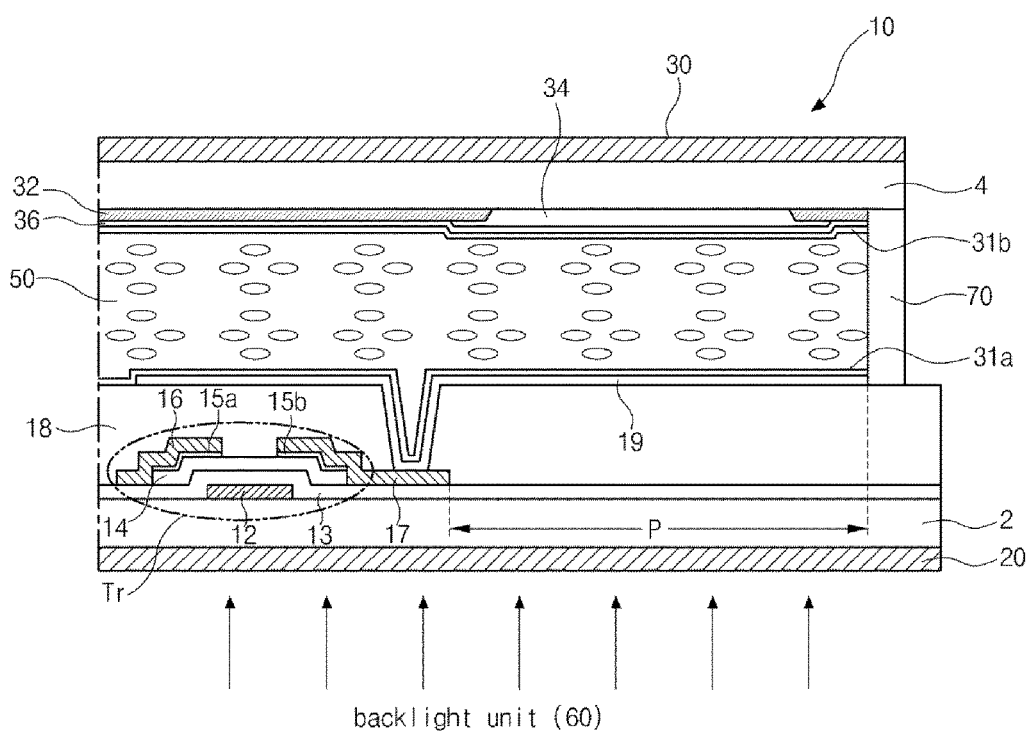
FIG. 1 is a cross-sectional view illustrating a liquid crystal display device according to the related art.

Reference will now be made in detail to various embodiments of the present disclosure, examples of which are illustrated in the accompanying drawings. In the following description, when a detailed description of well-known functions or configurations related to the present disclosure is determined to unnecessarily cloud the gist of the present disclosure, the detailed description thereof will be omitted. The progression of processing steps and/or operations described is an example; however, the sequence of steps and/or operations is not limited to the disclosures set forth herein and may be changed as is known in the art, with the exception of steps and/or operations necessarily occurring in a certain order. Like reference numerals designate like elements throughout. Names of the respective elements used in the following explanations are selected only for convenience of writing the specification and may, thus, be different from those used in actual products.

Advantages and features of the present invention, and implementation methods thereof will be clarified by the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present application to those skilled in the art. The present invention is only defined by the scope of any appended claims.

A shape, a size, a ratio, an angle, and a number disclosed in the drawings for describing embodiments of the present disclosure are merely exemplary, and thus, the present invention is not limited to the illustrated details. Like reference numerals refer to like elements throughout. In the following description, when the detailed description of relevant known functions or configurations are determined to unnecessarily obscure the important points of the present disclosure, the detailed description will be omitted. The terms 'comprise', 'have', and 'include' in the present specification may include additional parts unless the term 'only~' is also used with such terms. The terms of a singular form may include plural forms unless referred to the contrary.

In construing an element, an error range may be included even if no explicit description regarding the same in included in the specification.

In describing a position relationship, for example, when a position relation between two parts is described as 'on~', 'over~', 'under~', or 'next~', one or more parts may be disposed between the two parts unless the term 'just' or 'direct' is also used with such terms.

In describing a time relationship, for example, when the temporal order is described as 'after~', 'subsequent~', 'next~', or 'before~', a case which is not continuous may be included unless the term 'just' or 'direct' is also used with such terms.

Although the terms "first", "second", etc. may be used herein to describe various elements, these elements are not be limited by these terms. These terms are only used to distinguish one element from another. For example, a first element could, alternatively, be termed a second element, and, similarly, a second element could, alternatively, be termed a first element, without departing from the scope of the present disclosure.

Features of various embodiments of the present disclosure may be partially or completely coupled to, or combined with, each other, and may be variously inter-operated with each other and driven technically as those skilled in the art can sufficiently understand. Further, the embodiments of the present disclosure may be carried out independently from each other, or may be carried out together in co-dependent relationship.

Hereinafter, various embodiments of the present disclosure will be described in detail with reference to the accompanying drawings.

Figure 2:
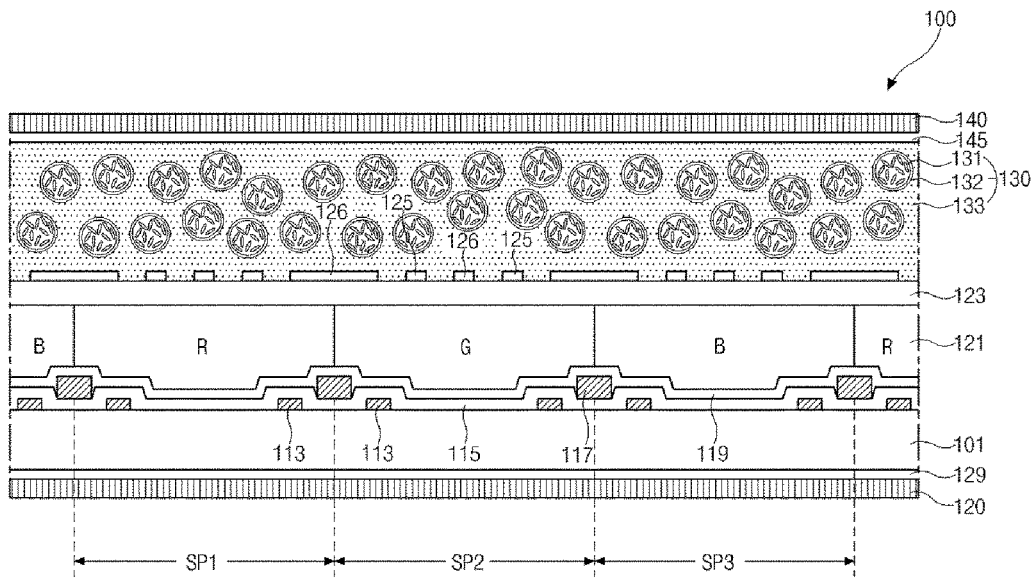
FIG. 2 is a cross-sectional view illustrating a liquid crystal display device according to a first embodiment of the present disclosure.

FIG. 2 is a cross-sectional view showing a liquid crystal display device according to a first embodiment of the present disclosure.

In FIG. 2, the liquid crystal display (LCD) device 100 includes a substrate 101, a color filter layer 121 on a first surface of the substrate 101, a passivation layer 123 on the color filter layer 121, first and second electrodes 125 and 126 spaced apart from each other on the passivation layer 123 and a liquid crystal capsule layer 130 on the first and second electrodes 125 and 126. Although not shown, a thin film transistor (TFT) is formed in each of at least three sub-pixels displaying different colors.

For example, first, second and third sub-pixels SP1, SP2 and SP3 displaying red, green and blue colors, respectively, may constitute a unit pixel. In another embodiment, first, second, third and fourth sub-pixels displaying red, green, blue and white colors may constitute a unit pixel.

Although not shown, the TFT may include a gate electrode connected to a gate line, a source electrode connected to a data line 117 between two of the first to third sub-pixels SP1 to SP3 and a drain electrode electrically connected to the first electrode 125.

A common line 113 is formed under the data line 117 with a gate insulating layer 115 interposed therebetween. The common line 113 may be disposed at both sides of the data line 117 and spaced apart from the data line 117.

An interlayer insulating layer 119 is formed on the data line 117, and the color filter layer 121 is formed on the interlayer insulating layer 119. The color filter layer 121 may include red, green and blue color filters R, G and B disposed in the first, second and third sub-pixels SP1, SP2 and SP3, respectively.

The passivation layer 123 is formed on the color filter layer 121, and the first and second electrodes 125 and 126 spaced apart from each other are formed on the passivation layer 123. The first and second electrodes 125 and 126 may have a shape of a plurality of bars parallel to the data line 117 and may be alternately disposed. Each of the first and second electrodes 125 and 126 may have a shape of a bent bar such that a straight bar is symmetrically bent at a central portion of each of the first, second and third sub-pixels SP1, SP2 and SP3. In addition, the outermost second electrode 126 of each of the first, second and third sub-pixels SP1, SP2 and SP3 may overlap with the data line 117 and the common line 113.

The liquid crystal capsule layer 130 is formed on the first and second electrodes 125 and 126, and first and second polarizing films 120 and 140 are formed on a second surface of the substrate 101 and the liquid crystal capsule layer 130, respectively.

The liquid crystal capsule layer 130 includes a plurality of liquid crystal capsules 132 and a buffer layer 133 where the plurality of liquid crystal capsules 132 are disposed. Each of the plurality of liquid crystal capsules 132 may have a diameter smaller than the wavelength of visible light and may include a plurality of liquid crystal molecules 131.

A film-type the liquid crystal capsule layer 130 may be formed on the first and second electrodes 125 and 126. Thus, contrary to the related art LCD device 10, which includes two substrates, the LCD device 100 includes a single substrate 101. As a result, the LCD device 100 is light weight and has a thin profile and a fabrication cost thereof is reduced.

In addition, the substrate 101 may be formed of a flexible material such as plastic because a cell gap of the liquid crystal capsule layer 130 is not distorted or changed by application of an external pressure or an external impact. As a result, the liquid crystal capsule layer 130 may be effectively applied to a flexible LCD device.

The first polarizing film 120 is attached to the second surface of the substrate 101 by a first adhesive 129, and the second polarizing film 140 is attached to an upper surface of the liquid crystal capsule layer 130 by a second adhesive 145. Unlike the first adhesive 129, the liquid crystal capsule layer 130 may deteriorate because the second adhesive 145 directly contacts the liquid crystal capsule layer 130 to attach the second polarizing film 140 to the liquid crystal capsule layer 130.

Each of the liquid crystal capsules 132 and the second adhesive 145 includes a water soluble component. The water soluble components of the liquid crystal capsule 132 and the second adhesive 145 may react with each other to deform the chemical properties of the liquid crystal capsules 132. As a result, the electric field applied to the liquid crystal capsule layer 130 may also be distorted by the deformation of the liquid crystal capsules 132, thereby deteriorating the display quality of the LCD device 100.

In addition, while the second polarizing film 140 is attached to the liquid crystal capsule layer 130, external moisture may penetrate into the liquid crystal capsule layer 130, thereby damaging the liquid crystal capsule layer 130.

When an electric field is not applied, the liquid crystal capsule layer 130 has an optically isotropic property. When an electric field is applied, the plurality of liquid crystal molecules 131 in each liquid crystal capsule 132 are aligned along a direction of the electric field and the liquid crystal capsule layer 130 has a birefringence property with respect to an incident light. As a result, the liquid crystal capsule layer 130 may have an optical axis according to the applied electric field and may transmit light by controlling the optical property of the liquid crystal capsule layer 130 by using the optical axis thereof.

The first polarizing film 120 may polarize the light incident to the liquid crystal capsule layer 130 from the backlight unit under the substrate 101, and the second polarizing film 140 may block or transmit the light through the liquid crystal capsule layer 130. Polarization axes (transmission axes) of the first and second polarizing films 120 and 140 may be perpendicular to each other. For example, when the polarization axis of the first polarizing film 120 is along a polarization direction having an angle of about 0 degree (or about 90 degrees) with respect to a horizontal direction, the polarization axis of the second polarizing film 140 is along a polarization direction having an angle of about 90 degrees (or 0 degree) with respect to the horizontal direction.

Operation of the liquid crystal capsule layer 130 will be illustrated hereinafter.

When an electric field is not generated between the first and second electrodes 125 and 126, the liquid crystal capsule layer 130 may transmit light through the first polarizing film 120 without changing the polarization of the light, and the LCD device 100 may display a black color.

In an OFF state where an electric field is not applied, the plurality of liquid crystal molecules 131 are randomly aligned (no retardation) and the light having a polarization direction through the first polarizing film 120 passes through the liquid crystal capsule layer 130 without any modification, scattering and/or change in polarization. As a result, when the light passing through the first polarizing film 120, and having a polarization axis of about 0 degree, is incident to the second polarizing film 140 having a polarization axis of about 90 degrees, the light is blocked by the second polarizing film 140, and the LCD device 100 displays a black color.

Contrary to the related art LCD device, where two alignment layers on two substrates are required to align a liquid crystal layer, the LCD device 100 does not require an alignment layer because the black color is displayed using the optical property of the liquid crystal capsule layer 130. As a result, the steps of printing and rubbing an alignment layer, which is required in the manufacturing process of the related art LCD device, may be omitted the manufacturing process of the LCD device 100.

When an electric field is generated between the first and second electrodes 125 and 126, the liquid crystal capsule layer 130 may rotate the polarization axis of the light through the first polarizing film 120, and the LCD device 100 may display a white color.

In an ON state where an electric field is applied, the plurality of liquid crystal molecules 131 are aligned along a direction of the electric field and the liquid crystal capsule layer 130 has a birefringence property (retardation). As a result, a polarization direction of light passing through the first polarizing film 120 is changed by the liquid crystal capsule layer 130. When the liquid crystal capsule layer 130 has a retardation ($\Delta n^*d$) of a half wavelength ($\lambda/2$) of the light, the polarization axis of the light rotates by about 90 degrees. Accordingly, the light passing through the liquid crystal capsule layer 130 also passes through the second polarizing film 140 having a polarization axis of about 90 degrees without absorption, and the LCD device 100 displays a white color.

Contrary to the liquid crystal layer 50 (as illustrated in FIG. 1) of the related art LCD device, the liquid crystal capsule layer 130 of the LCD device 100 according to the first embodiment of the present disclosure includes a plurality of liquid crystal capsules 132 each having a diameter of about 1 nm to a value less than the wavelength of visible light. As a result, the liquid crystal molecules 131 in each of the liquid crystal capsules 132 have a relatively high attractive force, and the liquid crystal molecules 131 and the liquid crystal capsules 132 have a relatively high attractive force. Accordingly, a driving voltage for the liquid crystal capsule layer 130 is relatively high.

Further, the second polarizing film 140 may have a dielectric constant higher than the liquid crystal capsule layer 130, and when such a polarizing film is formed on the liquid crystal capsule layer 130, electric field leakage that does not engage with the operation of the liquid crystal capsule layer 130 may be generated. As a result, transmittance of the LCD device 100 may be reduced due to the relatively high driving voltage and the electric field leakage.

Figure 3:
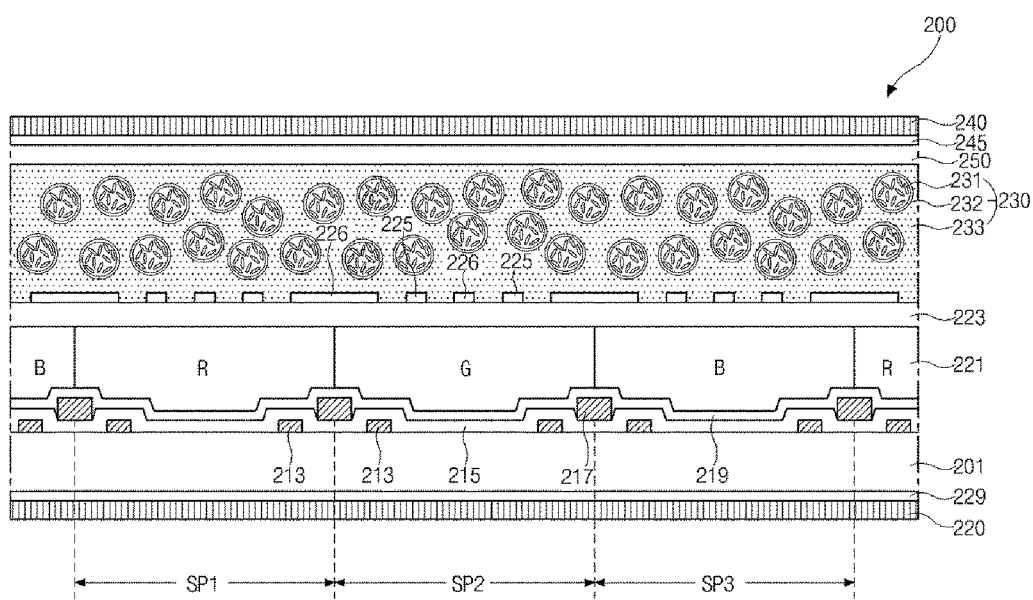
FIG. 3 is a cross-sectional view illustrating a liquid crystal display device according to a second embodiment of the present disclosure.
Figure 4A:
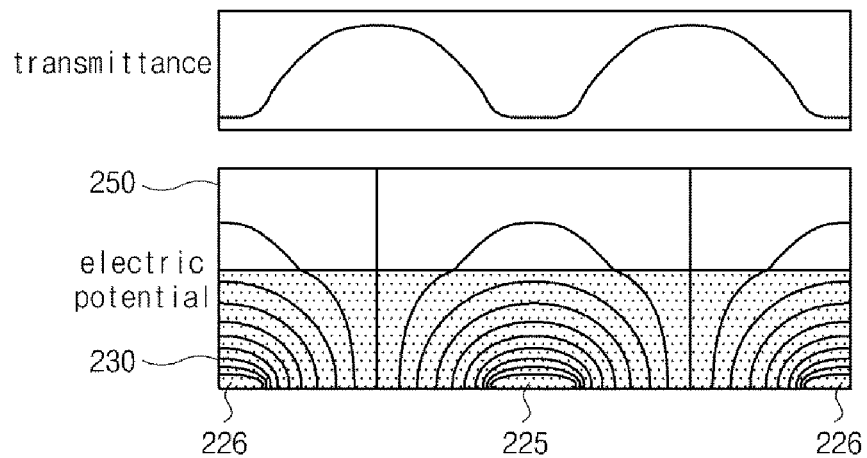
FIGS. 4A to 4D are illustrations of the electric potential and a transmittance of a liquid crystal display device according to the second embodiment of the present disclosure.
Figure 4B:
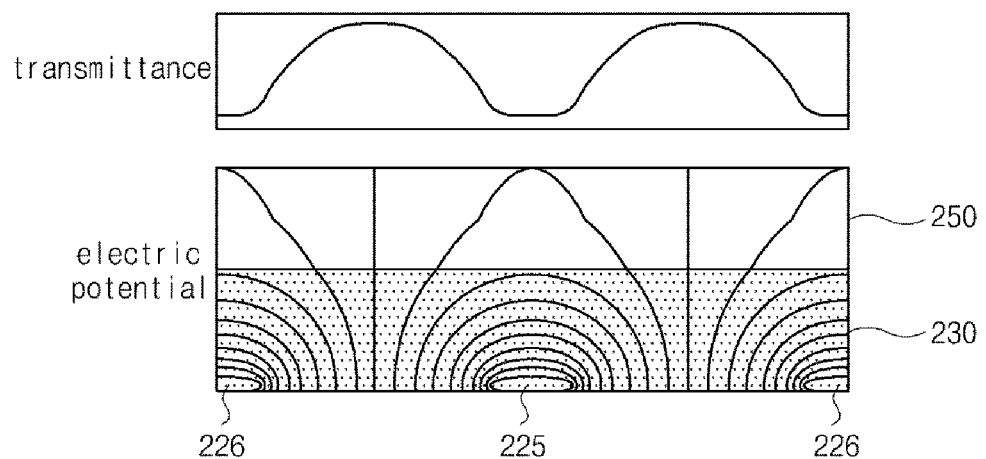
Figure 4C:
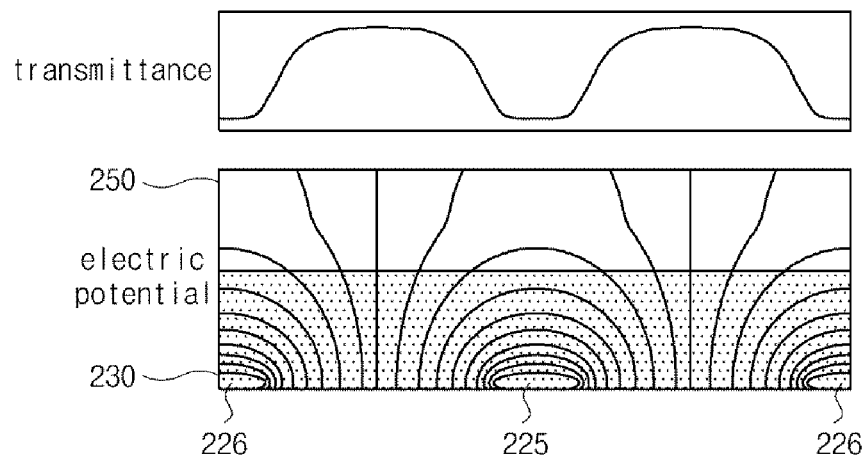
Figure 4D:
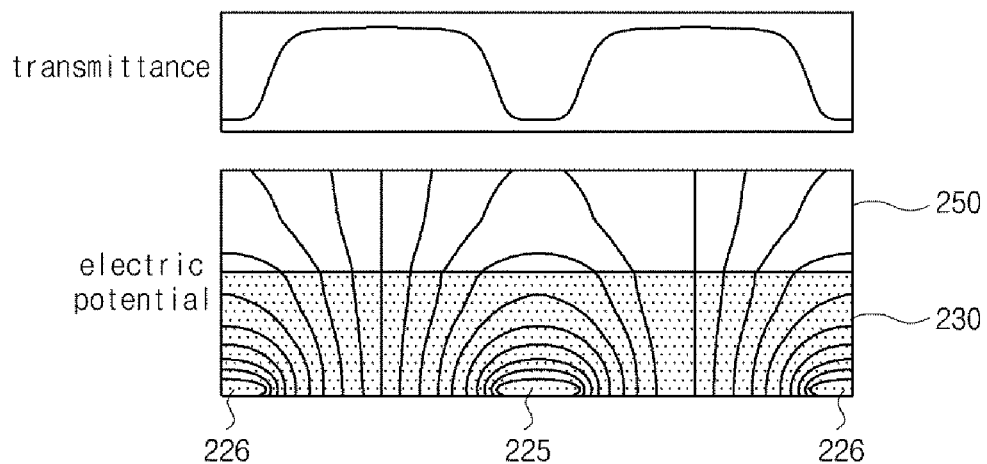

FIG. 3 is a cross-sectional view showing a liquid crystal display device 200 according to a second embodiment of the present disclosure.

As illustrated in FIG. 3, the liquid crystal display device 200 includes a substrate 201, a color filter layer 221 on a first surface of the substrate 201, a passivation layer 223 on the color filter layer 221, first and second electrodes 225 and 226 spaced apart from each other on the passivation layer 223, a liquid crystal capsule layer 230 on the first and second electrodes 225 and 226 and a dielectric layer 250 on the liquid crystal capsule layer 230. Although not shown, a thin film transistor (TFT) is formed in each of at least three sub-pixels displaying different colors.

For example, first, second and third sub-pixels SP1, SP2 and SP3 displaying red, green and blue colors, respectively, may constitute a unit pixel. In another embodiment, first, second, third and fourth sub-pixels displaying red, green, blue and white colors may constitute a unit pixel.

Although not shown, the TFT may include a gate electrode connected to a gate line, a source electrode connected to a data line 217 between two of the first to third sub-pixels SP1 to SP3 and a drain electrode electrically connected to the first electrode 225. The gate line and the data line 217 cross each other to define the first to third sub-pixels SP1 to SP3.

A common line 213 is formed under the data line 217 with a gate insulating layer 215 interposed therebetween. The common line 213 parallel to the data line 217 may be disposed at both sides of the data line 217 and spaced apart from the data line 217.

An interlayer insulating layer 219 is formed on the data line 217, and the color filter layer 221 is formed on the interlayer insulating layer 219. The color filter layer 221 may include red, green and blue color filters R, G and B disposed in the first, second and third sub-pixels SP1, SP2 and SP3, respectively.

The passivation layer 223 is formed on the color filter layer 221, and the first and second electrodes 225 and 226 spaced apart from each other are formed on the passivation layer 223. The first and second electrodes 225 and 226 may have a shape of a plurality of bars parallel to the data line 217 and may be alternately disposed. Each of the first and second electrodes 225 and 226 may have a shape of a bent bar such that a straight bar is symmetrically bent at a central portion of each of the first, second and third sub-pixels SP1, SP2 and SP3. In addition, the outermost second electrode 226 of each of the first, second and third sub-pixels SP1, SP2 and SP3 may overlap the data line 217 and the common line 213.

The liquid crystal capsule layer 230 is formed on the first and second electrodes 225 and 226. The liquid crystal capsule layer 230 includes a plurality of liquid crystal capsules 232 and a buffer layer 233, in which the plurality of liquid crystal capsules 232 are disposed. Each of the plurality of liquid crystal capsules 232 may have a diameter smaller than a wavelength of visible light and may include a plurality of liquid crystal molecules 231.

Specifically, the liquid crystal capsule layer 230 may be formed on the first and second electrodes 225 and 226 as a film. Thus, contrary to the related art LCD device, which includes two substrates, the LCD device 200 is fabricated to include a single substrate 201. As a result, the LCD device 200 is light weight and has a thin profile, and the fabrication cost is reduced.

In addition, the substrate 201 may be formed of a flexible material such as plastic because a cell gap of the liquid crystal capsule layer 230 is not distorted or changed by the application of external pressure or an external impact. As a result, the liquid crystal capsule layer 230 may be effectively applied to a flexible LCD device.

A dielectric layer 250 having a dielectric constant smaller than the liquid crystal capsule layer 230 may be formed on the liquid crystal capsule layer 230, and first and second polarizing films 220 and 240 may be formed on a second surface of the substrate 201 and the dielectric layer 250, respectively.

The first polarizing film 220 is attached to the second surface of the substrate 201 by a first adhesive 229, and the second polarizing film 240 is attached to an upper surface of the dielectric layer 250 by a second adhesive 245. Contrary to the first embodiment, the second adhesive 245 directly contacts the dielectric layer 250 to attach the second polarizing film 240 to the dielectric layer 250 and does not directly contact the liquid crystal capsule layer 230, thereby preventing deterioration of the liquid crystal capsule layer 230.

Each of the liquid crystal capsules 232 and the second adhesive 245 may include a water soluble component. In the display device 200, the water soluble components of the liquid crystal capsules 232 and the second adhesive 245 do not react with each other, because the two are not in contact with each other. Thus, deformation of the chemical properties of the liquid crystal capsule 232 may be prevented. As a result, distortion of an electric field applied to the liquid crystal capsule layer 230 due to the deformed liquid crystal capsule 232 is prevented.

In addition, while the second polarizing film 240 is attached to the dielectric layer 230, penetration of external moisture into the liquid crystal capsule layer 230 is prevented.

In another embodiment, the dielectric layer 250 may include an adhesive material and the second polarizing film 240 may be directly attached to the dielectric layer 250.

When an electric field is not applied, the liquid crystal capsule layer 230 has an optically isotropic property. When an electric field is applied, the plurality of liquid crystal molecules 231 in each liquid crystal capsule 232 are aligned along a direction of the electric field and the liquid crystal capsule layer 230 has a birefringence property with respect to incident light. As a result, the liquid crystal capsule layer 230 may have an optical axis according to the applied electric field and may transmit light by controlling the optical properties using the optical axis.

The first polarizing film 220 may polarize the light incident on the liquid crystal capsule layer 230 from the backlight unit under the substrate 201, and the second polarizing film 240 may block or transmit the light through the liquid crystal capsule layer 230. Polarization axes (transmission axes) of the first and second polarizing films 220 and 240 may be perpendicular to each other. For example, when the polarization axis of the first polarizing film 220 is along a polarization direction having an angle of about 0 degree (or about 90 degrees) with respect to a horizontal direction, the polarization axis of the second polarizing film 240 is along a polarization direction having an angle of about 90 degrees (or 0 degree) with respect to the horizontal direction.

Operation of the liquid crystal capsule layer 230 will be illustrated hereinafter.

When an electric field is not generated between the first and second electrodes 225 and 226, the liquid crystal capsule layer 230 may transmit light through the first polarizing film 220 without changing the polarization, and the LCD device 200 may display a black color.

For example, in an OFF state where an electric field is not applied, the plurality of liquid crystal molecules 231 are randomly aligned (no retardation) and the light having a polarization direction through the first polarizing film 220 passes through the liquid crystal capsule layer 230 without any modification, scattering and/or change in polarization. As a result, light passing through the first polarizing film 220, and having a polarization axis of about 0 degree, is incident on the second polarizing film 240, which has a polarization axis of about 90 degrees, and the light is blocked by the second polarizing film 240. Thus, the LCD device 200 displays a black color.

Contrary to the related art LCD device, in which two alignment layers on two substrates are required to align a liquid crystal layer, the LCD device 200 does not require an alignment layer because the black color is displayed by using the optical properties of the liquid crystal capsule layer 230. As a result, printing and rubbing of an alignment layer required in the process of manufacturing the related art LCD device may be omitted from the manufacturing process of the liquid crystal display device 200.

When an electric field is generated between the first and second electrodes 225 and 226, the liquid crystal capsule layer 230 may rotate the polarization axis of the light through the first polarizing film 220, and the LCD device 200 may display a white color.

In an ON state where an electric field is applied, the plurality of liquid crystal molecules 231 are aligned along a direction of the electric field and the liquid crystal capsule layer 230 has a birefringence property (retardation). As a result, a polarization direction of the light through the first polarizing film 220 is changed by the liquid crystal capsule layer 230. When the liquid crystal capsule layer 230 has a retardation ($\Delta n*d$) of a half wavelength ($\lambda/2$) of the light, the polarization axis of the light rotates by about 90 degrees. Accordingly, the light through the liquid crystal capsule layer 230 passes through the second polarizing film 240 also having a polarization axis of about 90 degrees without any modification and/or absorption, and the LCD device 200 displays a white color.

Contrary to the liquid crystal layer 50 (as illustrated in FIG. 1) of the related art LCD device, the liquid crystal capsule layer 230 of the LCD device 200 according to the second embodiment of the present disclosure includes a plurality of liquid crystal capsules 232 each having a diameter of about 1 nm to a value less than the wavelength of visible light. As a result, the liquid crystal molecules 231 in each of the liquid crystal capsules 232 have a relatively high attractive force, and the liquid crystal molecule 231 and the liquid crystal capsule 232 have a relatively high attractive force. Accordingly, a driving voltage for the liquid crystal capsule layer 230 is relatively high. Thus, for the purpose of driving the liquid crystal capsule layer 230 with a relatively low driving voltage, the driving voltage needs to be used effectively.

FIGS. 4A to 4D illustrate the electric potential and transmittance of the liquid crystal display device 200. Dielectric layers 250 of FIGS. 4A to 4D have dielectric constants of about 20, about 15, about 8 and about 2, respectively.

As illustrated in FIGS. 4A to 4D, as the dielectric constant of a dielectric layer 250 on the liquid crystal capsule layer 230 decreases, equipotential lines between first and second electrodes 225 and 226 are straightened. As a result, distribution of an electric field perpendicular to the equipotential lines converges into the liquid crystal capsule layer 230 and the dielectric layer 250, and the electric field in the liquid crystal capsule layer 230 and the dielectric layer 250 becomes dense. Accordingly, the electric field is effectively used in the liquid crystal capsule layer 230 and transmittance of the LCD device 200 is improved.

Further, in the LCD device 200, the electric field leakage that does not engage with the operation of the liquid crystal capsule layer 130 (as illustrated in FIG. 2) of the LCD device 100 is used to improve transmittance, because the second polarizing film 240 having a dielectric constant higher than the liquid crystal capsule layer 230 is not directly attached to the liquid crystal capsule layer 230 and the dielectric layer 250 having a dielectric constant lower than the liquid crystal capsule layer 230 is disposed between the liquid crystal capsule layer 230 and the second polarizing film 240.

For example, when the liquid crystal capsule layer 230 has a dielectric constant of about 8, the dielectric layer 250 may have a dielectric constant lower than about 8. In another embodiment, the dielectric constant of the dielectric layer 250 may vary according to the dielectric constant of the liquid crystal capsule layer 230.

Further, since the dielectric layer 250 transmits light from the backlight unit under the substrate 201, the dielectric layer 250 may be formed of a transparent organic insulating material or a transparent inorganic insulating material. The dielectric layer 250 may be formed through various methods including a deposition method and a coating method.

The dielectric layer 250 may have a thickness of about 2 μm to about 5 μm to create a space where the electric field converges into the dielectric layer 250.

Consequently, in the liquid crystal display device according to the second embodiment of the present disclosure, deterioration of the liquid crystal capsule layer is prevented because the dielectric layer is disposed on the liquid crystal capsule layer. In addition, the transmittance of the liquid crystal display device is improved because the electric field leakage is used for operating the liquid crystal capsule layer.

The liquid crystal display device according to the second embodiment may be embodied in many other ways. For instance, in some embodiments, the dielectric layer may be formed with the underlying layers as an integral piece, so as to improve the processing efficiency for manufacturing the liquid crystal display device. In an embodiment, the dielectric layer may be formed with the liquid crystal capsule layer as an integral part and is subsequently connected to a polarizing film directly or via e.g. an adhesive layer. The dielectric layer may additionally protect the liquid crystal capsule layer from being contaminated or damaged during processing.

In some embodiments, the liquid crystal display device may comprise an assembly substrate, wherein the assembly substrate comprises first and second electrodes spaced apart from each other on the same plane, and a liquid crystal capsule layer on the first and second electrodes. In an embodiment, the assembly substrate may further comprise a dielectric layer on the liquid crystal capsule layer, and a dielectric constant of the dielectric layer is lower than a dielectric constant of the liquid crystal capsule layer. In a further embodiment, the assembly substrate may further comprise a substrate as a base underlying the first and second electrodes. In a further embodiment, the assembly substrate may be subsequently connected to a polarizing film directly or via e.g. adhesive at the side of the dielectric layer.

A number of examples have been described above, but the present disclosure in not limited thereto. It is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the appended claims.

What is claimed is:

1. A liquid crystal display device comprising:
   a substrate having first and second surfaces opposite to each other;
   first and second electrodes on the first surface of the substrate, the first and second electrodes being spaced apart from each other;
   a liquid crystal capsule layer on the first and second electrodes;
   a dielectric layer on the liquid crystal capsule layer;
   a first polarizing film on the second surface of the substrate; and
   a second polarizing film on the dielectric layer,
   wherein a dielectric constant of the dielectric layer is lower than a dielectric constant of the liquid crystal capsule layer, and
   wherein a dielectric constant of the second polarizing film is higher than the dielectric constant of the liquid crystal capsule layer such that the dielectric constant of the liquid crystal capsule layer is between the dielectric constant of the dielectric layer and the dielectric constant of the second polarizing film.

2. The device of claim 1,
   wherein a polarization axis of the first polarizing film is perpendicular to a polarization axis of the second polarizing film.

3. The device of claim 2, wherein the dielectric layer includes an adhesive material.

4. The device of claim 2, further comprising an adhesive layer between the dielectric layer and the second polarizing film.

5. The device of claim 1, wherein the dielectric layer includes a transparent material.

6. The device of claim 1, wherein the dielectric layer has a dielectric constant lower than 8.

7. The device of claim 1, wherein the dielectric layer has a thickness of 2 μm to 5 μm.

8. The device of claim 1, wherein the liquid crystal capsule layer has a film type.

9. The device of claim 1, further comprising:
   a color filter layer on the substrate; and
   a passivation layer on the color filter layer,
   wherein the first and second electrodes are disposed on the passivation layer.

10. The device of claim 1, further comprising:
    a gate line on the substrate;
    a data line crossing the gate line;
    a common line parallel to the data line; and
    a thin film transistor connected to the gate line and the data line.

11. The device of claim 1, wherein the dielectric layer is formed with the liquid crystal capsule layer as an integral part and is connected to a polarizing film via adhesive.

* * * * *